(12) United States Patent
Park

(10) Patent No.: US 9,524,814 B2
(45) Date of Patent: Dec. 20, 2016

(54) METAL-OXIDE SINTERED BODY FOR TEMPERATURE SENSOR, AND METHOD FOR MANUFACTURING SAME

(71) Applicant: INDUSTRY-ACADEMIC COOPERATION FOUNDATION, CHOSUN UNIVERSITY, Gwangju (KR)

(72) Inventor: Jin Seong Park, Gwangju (KR)

(73) Assignee: INDUSTRY-ACADEMIC COOPERATION FOUNDATION, CHOSUN UNIVERSITY, Gwangju (KR)

( * ) Notice: Subject to any disclaimer, the term of this patent is extended or adjusted under 35 U.S.C. 154(b) by 213 days.

(21) Appl. No.: 14/400,057

(22) PCT Filed: May 10, 2013

(86) PCT No.: PCT/KR2013/004149
§ 371 (c)(1),
(2) Date: Nov. 10, 2014

(87) PCT Pub. No.: WO2013/169064
PCT Pub. Date: Nov. 14, 2013

(65) Prior Publication Data
US 2015/0137050 A1 May 21, 2015

(30) Foreign Application Priority Data

May 11, 2012 (KR) .................. 10-2012-0050024
May 10, 2013 (KR) .................. 10-2013-0053017

(51) Int. Cl.
*H01B 1/08* (2006.01)
*H01C 7/10* (2006.01)
(Continued)

(52) U.S. Cl.
CPC ............ *H01C 7/008* (2013.01); *C01G 25/006* (2013.01); *C01G 53/70* (2013.01); *C04B 35/488* (2013.01);
(Continued)

(58) Field of Classification Search
CPC ................ H01B 1/00; H01B 1/08; H01C 7/10
See application file for complete search history.

(56) References Cited

U.S. PATENT DOCUMENTS 6,306,315 B1 * 10/2001 Ogata .................. C04B 35/016
252/518.1
2002/0020949 A1 * 2/2002 Kuzuoka ................ H01C 7/008
266/280

FOREIGN PATENT DOCUMENTS

JP         2005-235754 A    9/2005
KR    10-20120020836 A      3/2012
KR       10-1138246 B1      4/2012

OTHER PUBLICATIONS

International Search Report for PCT/KR2013/004149, mail date Sep. 4, 2013.

* cited by examiner

*Primary Examiner* — Mark Kopec
(74) *Attorney, Agent, or Firm* — The PL Law Group, PLLC

(57) ABSTRACT

A metal-oxide sintered body for a temperature sensor that can be installed in a combustion engine and components connected to the engine in order to sense temperature uses metal oxide. The metal-oxide sintered body has particles with large resistance values and particles with small resistance values mixed therein. The particles with the small resistance values may serve as a main resistance component in the temperature range of 0° C. to 500° C., and the particles with the large resistance values may contribute to the total (Continued)

resistance in proportion to the mixing ratio in the temperature range of 500° C. to 900° C. Thus, the metal-oxide sintered body enables a single sensor to measure all resistances, and can be used in an exhaust device or the like of a motor vehicle that requires temperature measurement over a wide range of temperatures.

13 Claims, 7 Drawing Sheets

(51) Int. Cl.
    *H01C 7/00*     (2006.01)
    *C01G 53/00*     (2006.01)
    *C04B 35/64*     (2006.01)
    *G01K 7/22*     (2006.01)
    *C01G 25/00*     (2006.01)
    *H01C 7/02*     (2006.01)
    *C04B 35/488*     (2006.01)
    *C04B 35/626*     (2006.01)

(52) U.S. Cl.
    CPC ......... *C04B 35/62675* (2013.01); *C04B 35/64* (2013.01); *G01K 7/22* (2013.01); *H01B 1/08* (2013.01); *H01C 7/02* (2013.01); *C01P 2004/03* (2013.01); *C01P 2006/40* (2013.01); *C04B 2235/3217* (2013.01); *C04B 2235/3225* (2013.01); *C04B 2235/3262* (2013.01); *C04B 2235/3272* (2013.01); *C04B 2235/3279* (2013.01); *C04B 2235/54* (2013.01); *C04B 2235/5445* (2013.01); *C04B 2235/5454* (2013.01); *C04B 2235/5481* (2013.01); *C04B 2235/78* (2013.01); *G01K 2205/04* (2013.01)

METAL-OXIDE SINTERED BODY FOR TEMPERATURE SENSOR, AND METHOD FOR MANUFACTURING SAME

CROSS REFERENCE TO RELATED APPLICATIONS AND CLAIM OF PRIORITY

This patent application claims benefit under 35 U.S.C. 119(e), 120, 121, or 365(c), and is a National Stage entry from International Application No. PCT/KR2013/004149, filed 10 May 2013, which claims priority to Korean Patent Application Nos. 10-2012-0050024, filed 11 May 2012, and 10-2013-0053017, filed 10 May 2013, entire contents of which are incorporated herein by reference.

TECHNICAL FIELD

The present application relates to a metal-oxide sintered body for a temperature sensor, which can be installed in a combustion engine and components connected to the engine in order to sense temperature, as well as to a method for manufacturing same. The metal-oxide sintered body uses metal oxide, which may sense the temperature over a wide range of temperatures and exhibit high resistance characteristics.

BACKGROUND

As fossil fuels including gasoline, diesel oil, kerosene, LNG, LPG, etc. become exhausted, the prices of fossil fuels rise rapidly, and thus there is an urgent need for the development of technologies capable of increasing the combustion efficiency of the fuels. In addition, as environmental standards become more stringent, there is a need for the development of various devices capable of reducing toxic gases that are generated during combustion of fossil fuels. Such technologies include temperature sensors that are installed in vehicle exhaust devices. In particular, in the case of diesel vehicles, regulations for dust, NOx and the like, which are generated during combustion, have become more stringent, and thus it is almost essential to mount exhaust devices that can reburn toxic gas or convert toxic gases into non-toxic gases. A temperature sensor that is used in the exhaust device should basically exhibit optimal efficiency even at a temperature equal to or higher than 500° C., and thus is required to have high precision and strong durability. In addition, since there is a great difference in temperature between the daytime and nighttime, seasons, and areas in which vehicles are driven, it should be possible to measure temperature over the temperature range of about 0° C. to 900° C.

In general, temperature sensors are manufactured using metals or metal oxides. In particular, temperature sensors that are used in high-temperature environments are made mainly of metal oxides. For the manufacture of temperature sensors made of metal oxides, transition metal oxides, such as $Fe_2O_3$, NiO, $Cr_2O_3$, $MnO_2$ or the like, are mainly used. Generally, the transition metal oxides are mixed with sintering aids or resistance regulators, such as $Al_2O_3$, $SiO_2$, $Y_2O_3$ or the like, and subjected to ceramic processes including calcination and sintering, after which they are manufactured into temperature sensors. Generally, such ceramic temperature sensors exhibit a very high resistance of $10^6$ ohm or higher at room temperature, and exhibit a resistance of a few ohms at high temperature equal to or higher than 700° C. Thus, it is not easy to increase the high-temperature resistance of most ceramics.

As described above, a temperature sensor to be used in a vehicle exhaust device should be measured with a universal meter over a wide temperature range from a low temperature of about 0° C. to a high temperature of about 900° C. To satisfy this condition, the resistance of the metal oxide that is used in the temperature sensor should be about 1 Mohm at 0° C., and about 30 ohm or higher at 900° C. Accordingly, the general ceramic temperature sensors as described above were not suitable for use in vehicle exhaust devices. In addition, metal oxide temperature sensors according to the prior art were manufactured according to the classification, depending on the environment in which they would be used, into a temperature sensor for low-temperature use, a temperature sensor for intermediate-temperature use, and a temperature sensor for high-temperature use. Meanwhile, $ZrO_2$ has been used mainly as a temperature sensor for high-temperature use of equal to or higher than 500° C. because it has an infinite resistance value at room temperature.

Accordingly, in order to solve the problem in which the high temperature resistance of conventional ceramic temperature sensors is significantly lowered, the present inventor has completed the present disclosure intended to provide a technology for manufacturing a temperature sensor that is manufactured by heat-treating either an insulating material having high-temperature stability or a high-resistance ceramic material at a high temperature to prepare a high-resistance material having a large particle size, and mixing the high-resistance material with a low-resistance material having a small particle size to increase the total resistance, and that can precisely measure temperature over the temperature range from 0° C. or lower to 900° C.

SUMMARY

Accordingly, an object of the present application is to provide a method for producing a metal-oxide sintered body that can be used as a temperature sensor over a wide temperature range, and a metal-oxide sintered body that is produced using the method. Another object of the present application is to provide a thermistor element and a temperature sensor, including the thermistor element, using the metal-oxide sintered body.

In order to achieve the above objects, the present application provides a method for producing a metal-oxide sintered body, the method comprising the steps of: a) heat-treating a metal oxide, selected from the group consisting of $ZrO_2$, $Al_2O_3$, $Y_2O_3$, $CeO_2$, MgO, $SiO_2$, $Ta_2O_5$ and $ThO_2$, at a temperature equal to or higher than ½ of the melting temperature thereof to prepare powder; b) heat-treating a composition having a formula of $Mn_{0.27}Fe_{0.16}Ni_{0.27}Y_{0.2}Al_{0.1}O_{1.5}$ at a temperature ranging from 1,000° C. to 1,500° C. for 1-5 hours to prepare powder; and c) mixing the power prepared in step a) with the powder prepared in step b), and heat-treating the mixture at a temperature ranging from 1,100° C. to 1,700° C. for 30 minutes to 2 hours, thereby producing a metal-oxide sintered body having a formula of $Mn_{0.108}Fe_{0.064}Ni_{0.108}Y_{0.28}Al_{0.04}Zr_{0.402}O_{1.701}$ (wherein X represents a metal contained in the metal oxide used in step a)).

In an embodiment of the present application, the metal oxide may be a single metal oxide, a composite metal oxide, or a metal oxide comprising an additive for particle growth or phase stabilization.

In an embodiment of the present application, the method for producing the metal-oxide sintered body may be a method comprising the steps of:

a) mixing $ZrO_2$ with an additive for stabilizing $ZrO_2$, followed by heat treatment at a temperature equal to or higher than ½ of the melting temperature of $ZrO_2$ to prepare powder;

b) heat-treating a composition having a formula of $Mn_{0.27}Fe_{0.16}Ni_{0.27}Y_{0.2}Al_{0.1}O_{1.5}$ at a temperature ranging from 1,000° C. to 1,500° C. for 1-5 hours to prepare powder; and c) mixing the powder prepared in step a) with the powder prepared in step b), and heat-treating the mixture at a temperature ranging from 1,100° C. to 1,700° C. for 30 minutes to 2 hours, thereby producing a metal-oxide sintered body having a formula of $Mn_{0.108}Fe_{0.064}Ni_{0.108}Y_{0.28}Al_{0.04}Zr_{0.402}O_{1.701}$.

In an embodiment of the present application, the additive of step a) may be one or more selected from the group consisting of $Al_2O_3$, $Y_2O_3$, $CeO_2$, $MgO$, $SiO_2$, $Ta_2O_5$ and $ThO_2$.

In an embodiment of the present application, the heat treatment of step a) may be performed at a temperature ranging from 1,000° C. to 2,000° C. for 10-15 hours.

In an embodiment of the present application, the heat treatment of step a) may be performed at 1,550° C. In an embodiment of the present application, the heat treatment of step a) may be performed for 12 hours.

In an embodiment of the present application, the powder prepared in step a) may have a relatively large particle size, and the powder prepared in step b) may have a relatively small particle size. In addition, the powder prepared in step a) may have a relatively high resistance value, and the powder prepared in step b) may have a relatively low resistance value.

In an embodiment of the present application, the mixing ratio between the two powders in step c) may range from 95:5 to 5:95.

In an embodiment of the present application, the production method of the present application may further comprise the step of selecting powder only having a desired particle size by sieving after preparing the powder at step a).

The present application also provides a metal-oxide sintered body produced according to the production method of the present application.

The present application also provides a thermistor element comprising a metal-oxide sintered body produced according to the production method of the present application.

The present application also provides a temperature sensor comprising the thermistor element.

The metal-oxide sintered body produced according to the method of the present application includes a mixture of particles having a high resistance value and particles having a low resistance value. Accordingly, in the temperature range from 0° C. to 500° C., the particles having a low resistance value serve as a major resistance component, and in the high temperature range from 500° C. to 900° C., the particles having a high resistance value contribute to the total resistance depending on the mixing ratio to thereby increase the total resistance value. Therefore, the metal-oxide sintered body enables a single sensor to measure all resistance values, i.e. temperatures, in the temperature range from 0° C. or lower to 900° C., and thus can be used in vehicle exhaust devices and the like, the temperatures of which are required to be measured over a wide temperature range.

DETAILED DESCRIPTION

Figure 1:
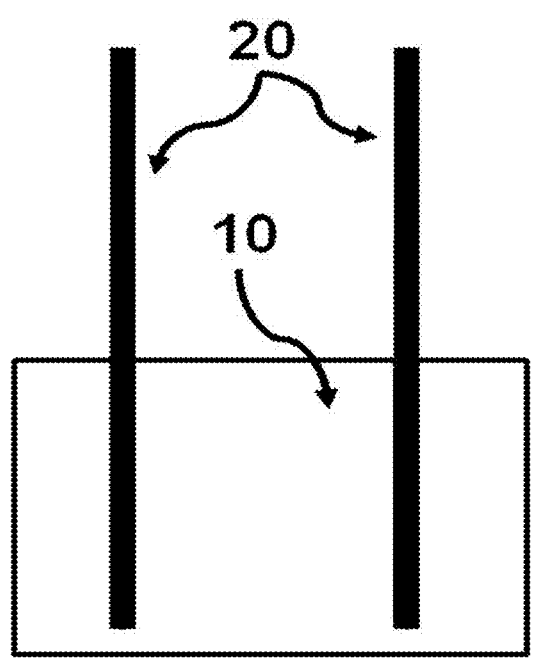
FIG. 1 is a sectional view of a temperature sensor manufactured according to an embodiment of the present application (10: temperature sensor; and 20: electrodes)

Conventional metal oxide temperature sensors had excessively high resistance at room temperature and excessively low resistance at high temperatures, and thus were manufactured according to the classification into a temperature sensor for low-temperature use, a temperature sensor for intermediate-temperature use, and a temperature sensor for high-temperature use. Accordingly, the present inventor has reached to the present disclosure intended to provide a temperature sensor that can be used all over a wide temperature range. Therefore, the present application provides a technology for producing a metal-oxide sintered body produced by mixing stabilized $ZrO_2$ powder, prepared by heat treatment at a high temperature (1,000° C. or higher) and having a large particle size and high resistance, with powder of a material having a small particle size and low resistance, in which the metal-oxide sintered body is used for a temperature sensor capable of measuring resistance over the temperature range from 0° C. or lower to 900° C.

The method for producing a metal-oxide sintered body according to the present application comprises the steps of:

a) heat-treating a metal oxide, selected from the group consisting of $ZrO_2$, $Al_2O_3$, $Y_2O_3$, $CeO_2$, $MgO$, $SiO_2$, $Ta_2O_5$ and $ThO_2$, at a temperature equal to or higher than ½ of the melting temperature thereof to prepare powder;

b) heat-treating a composition having a formula of $Mn_{0.27}Fe_{0.16}Ni_{0.27}Y_{0.2}Al_{0.1}O_{1.5}$ at a temperature ranging from 1,000° C. to 1,500° C. for 1-5 hours to prepare powder; and c) mixing the power prepared in step a) with the powder prepared in step b), and heat-treating the mixture at a temperature ranging from 1,100° C. to 1,700° C. for 30 minutes to 2 hours, thereby producing a metal-oxide sintered body having a formula of $Mn_{0.108}Fe_{0.064}Ni_{0.108}Y_{0.28}Al_{0.04}Zr_{0.402}O_{1.701}$ (wherein x represents a metal contained in the metal oxide used in step a)).

The metal oxide that is selected at step a) is a high-resistance material functioning to increase the total resistance of the metal-oxide sintered body of the present application. The metal oxide that is used as a resistance material may be a single-phase metal oxide, a composite metal oxide including a mixture of two or more phases, a metal oxide having added thereto an additive for particle growth or phase stabilization, a metal element, or a metal compound. In a preferred embodiment of the present application, the metal oxide may be $ZrO_2$. $ZrO_2$ has been used mainly as a temperature sensor for high-temperature use of equal to or higher than about 500° C., because it has an infinite resistance value at room temperature. Stabilized $ZrO_2$ grown into large particles has almost insulating characteristics at room temperature, and thus cannot be measured with a universal meter, but shows a resistance of several hundreds of ohms at a temperature of about 900° C. or higher.

Step b) is the step of preparing a material having a low resistance value, in which a semiconductor metal oxide or a composite metal oxide may be used. $Mn_{0.27}Fe_{0.16}Ni_{0.27}Y_{0.2}Al_{0.1}O_{1.5}$ is an example of particles that show a low resistance value and have a small particle size, and powder may be prepared by heat-treating this material at a temperature of 1,000° C. to 1,500° C., preferably 1,200° C., for about 2 hours.

Step c) is the step of mixing the powder of step a), which has a large size and exhibits high resistance, with the powder of step b), which has a small size and exhibits low resistance, and heat-treating the mixture. When the material having a large size is mixed with the material having a small size as described above, the reaction between the two materials is minimized. Also, when the material having low resistance is mixed with the material having high resistance, the material having low resistance serves as a major resistance component at a relatively low temperature (500° C. or lower), and the material having high resistance has a decreased resistance value at a relatively high temperature (500° C. or higher), and thus the material having high resistance serves as a resistance component depending on its mixing ratio to thereby increase the total resistance of the mixture. Thus, the temperature in a wide temperature range can be measured with a single sensor.

In an embodiment of the present application, the metal oxide may be $ZrO_2$, and particles, which have a small particle size and show low resistance, may be $Mn_{0.27}Fe_{0.16}Ni_{0.27}Y_{0.2}Al_{0.1}O_{1.5}$. In the production method of the present application, $Mn_{0.27}Fe_{0.16}Ni_{0.27}Y_{0.2}Al_{0.1}O_{1.5}$ may be calcined at 1200° C. for 2 hours, and then ground, and the resulting powder may be used as low-resistance powder. In addition, $ZrO_2$ that is a material serving to increase the resistance of the low-resistance material may be heat-treated at 1,550° C. for 12 hours to prepare powder that has a large particle size and exhibits high resistance. Herein, pure $ZrO_2$ has a high volume expansion rate due to phase transition at about 1,000° C., and thus is required to be stabilized. To stabilize the $ZrO_2$ phase, $Y_2O_3$, $CeO_2$, CaO, MgO or the like may be added in an amount of 5-20 mole %, after which the heat-treatment may be performed. $ZrO_2$ powder prepared in this manner functions as a high-resistance material having a stable phase and a large particle size. In other words, when the high-resistance material $ZrO_2$ having a large particle size is mixed with low-resistance $Mn_{0.27}Fe_{0.16}Ni_{0.27}Y_{0.2}Al_{0.1}O_{1.5}$ to minimize the reaction therebetween, $ZrO_2$ will have a very high resistance in the temperature range from 0° C. to 500° C., and thus the low-resistance $Mn_{0.27}Fe_{0.16}Ni_{0.27}Y_{0.2}Al_{0.1}O_{1.5}$ composition will serve as a major resistance component in that temperature range. In the high temperature range from 500° C. to 900° C., $ZrO_2$ will have a low resistance value, and thus will also serve as a resistance component depending on the mixing ratio to thereby increase the total resistance value. This suggests that a single sensor can measure all resistance values, that is, temperatures in the overall temperature range from 0° C. or lower to 900° C. The conventional stabilization temperature of $ZrO_2$ is 1300° C. or lower, and thus when $ZrO_2$ is heat-treated at a temperature of 1,550° C. higher than the conventional stabilization temperature thereof, it will grow into particles having a very large particle size. Thus, the diffusion length of $ZrO_2$ for a reaction with the low-resistance material in a sintering process for densification will increase, and thus the reaction will be minimized so that the characteristics of high-resistance $ZrO_2$ are maintained even for sintering at 1,400° C. Accordingly, in an embodiment of the present application, a metal-oxide sintered body that can precisely measure temperature in the temperature range from 0° C. or lower to 900° C. can be produced by mixing low-resistance powder particles, calcined at 1,200° C. for 2 hours and having a formula of $Mn_{0.27}Fe_{0.16}Ni_{0.27}Y_{0.2}Al_{0.1}O_{1.5}$, with high-resistance $ZrO_2$ powder stabilized by heat treatment at 1,550° C. for 12 hours, at a ratio of 4:6, and heat-treating the mixture by sintering at 1,400° C. for 1 hour.

In an embodiment of the present application, the method for producing the metal-oxide sintered body may be a method comprising the steps of:

a) mixing $ZrO_2$ with an additive for stabilizing $ZrO_2$, followed by heat treatment at a temperature equal to or higher than ½ of the melting temperature of $ZrO_2$ to prepare powder;

b) heat-treating a composition having a formula of $Mn_{0.27}Fe_{0.16}Ni_{0.27}Y_{0.2}Al_{0.1}O_{1.5}$ at a temperature ranging from 1,000° C. to 1,500° C. for 1-5 hours to prepare powder; and c) mixing the powder prepared in step a) with the powder prepared in step b), and heat-treating the mixture at a temperature ranging from 1,100° C. to 1,700° C. for 30 minutes to 2 hours, thereby producing a metal-oxide sintered body having a formula of $Mn_{0.108}Fe_{0.064}Ni_{0.108}Y_{0.28}Al_{0.04}Zr_{0.402}O_{1.701}$.

The present application may also provide a thermistor element or temperature sensor using the metal-oxide sintered body. Generally, temperature sensors are manufactured using metals or metal oxides, and particularly, temperature sensors used in high-temperature environments are made mainly of metal oxides. For the manufacture of the metal oxide temperature sensor, a transition metal oxide such as $Fe_2O_3$, NiO, $Cr_2O_3$, $MnO_2$ or the like is mainly used. The transition metal oxide is mixed with a sintering aid or a resistance regulator, such as $Al_2O_3$, $SiO_2$, $Y_2O_3$ or the like, and the mixture is subjected to ceramic processes including calcination and sintering to prepare a sample. After preparation of the sample, a device may be manufactured by forming electrodes on the surface of the sample by printing or plating, and bonding a lead wire made of Ni, Pt, Au, Cu or the like thereto.

EXAMPLES

The present application will be described in detail with reference to examples below. It will be apparent to those skilled in the art that these examples are for illustrative purposes only and are not intended to limit the scope of the present application.

Example 1

Metal Oxide Samples

Metal oxide samples used in the Examples of the present application are $MnO_2$, $Fe_2O_3$, NiO, $Y_2O_3$, $Al_2O_3$ and $ZrO_2$. The chemical composition of these samples was presumed to have the integer ratio of moles even after heat treatment. It is to be understood that if necessary, the metal components may be oxidized, and that the molar composition ratio of transition metal oxides may change.

Example 2

Manufacture of Temperature Sensor According to the Present Application

FIG. 1 is a sectional view of a temperature sensor manufactured using a metal-oxide sintered body produced according to the production method of the present application. Powder obtained by adding $Y_2O_3$ to $ZrO_2$, wet-mixing these components and heat-treating the mixture at 1,550° C. for 12 hours was mixed with powder obtained by wet-mixing $MnO_2$, $Fe_2O_3$, NiO, $Y_2O_3$ and $Al_2O_3$ to prepare a composition of $Mn_{0.27}Fe_{0.16}Ni_{0.27}Y_{0.2}Al_{0.1}O_{1.5}$ and heat-treating the composition at 1,200° C. for 2 hours, thereby preparing powder having a composition of $Mn_{0.108}Fe_{0.064}Ni_{0.108}Y_{0.28}Al_{0.04}Zr_{0.402}O_{1.701}$. The prepared powder was placed in a mold, and press-molded in such a manner that Pt electrodes were present at a predetermined distance, thereby preparing a molded sample. A temperature sensor 10 of the molded sample had a size of 2 mm×2 mm×2 mm. Electrodes 20 were made of a Pt-13% Rh alloy having a diameter of 0.3 mm. The electrodes 20 were fabricated by inserting each electrode at a distance of 0.6 mm, press-molding the inserted electrodes, and simultaneously sintering the molded electrodes at 1,400° C. for 1 hour.

Example 3

Resistance Characteristics of Temperature Sensor According to the Present Application Example 3-1

Figure 2:
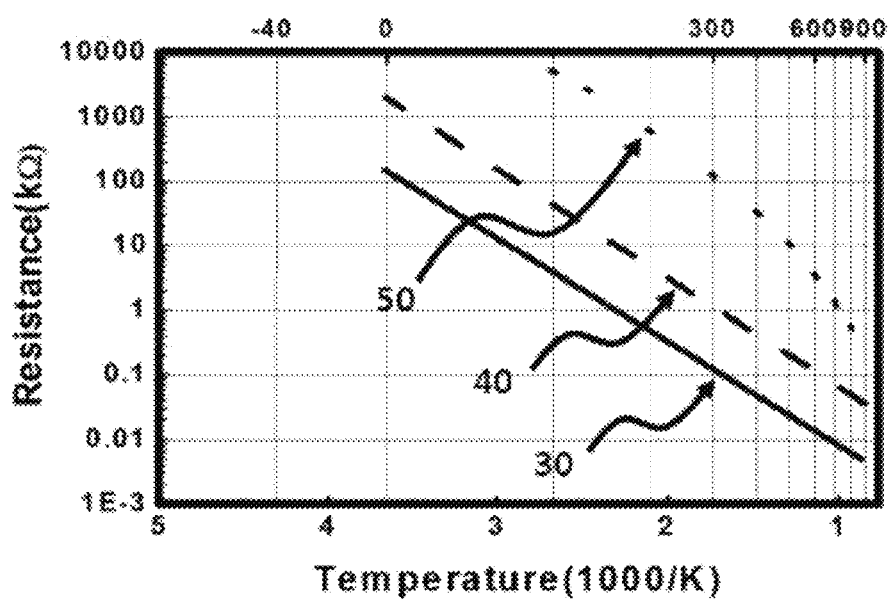
FIG. 2 is a temperature-resistance graph showing the resistance characteristics of a temperature sensor manufactured according to an embodiment of the present application (30: the temperature-resistance characteristics of $Mn_{0.27}Fe_{0.16}Ni_{0.27}Y_{0.2}Al_{0.1}O_{1.5}$; 40: the temperature-resistance characteristics of $Mn_{0.108}Fe_{0.064}Ni_{0.108}Y_{0.28}Al_{0.04}Zr_{0.402}O_{1.701}$ obtained by heat-treating $ZrO_2$ having added thereto 20 mole % of $Y_2O_3$ at 1,550° C. and mixing; and 50: the temperature-resistance characteristics of $Mn_{0.108}Fe_{0.064}Ni_{0.108}Y_{0.28}Al_{0.04}Zr_{0.402}O_{1.701}$ obtained by mixing $ZrO_2$ having added thereto 20 mole % of $Y_2O_3$, without heat-treatment at 1,550° C.)

The electrical resistance value of a sample was measured with a multimeter in a temperature equilibrium state while elevating the temperature after placing the sample in a tube-type furnace. FIG. 2 is a temperature-resistance graph showing the resistance characteristics of a temperature sensor manufactured according to an embodiment of the present application. Reference numeral 30 of FIG. 2 is a graph of comparative example showing the result of measuring the temperature-resistance characteristics of $Mn_{0.27}Fe_{0.16}Ni_{0.27}Y_{0.2}Al_{0.1}O_{1.5}$ sensor exhibiting a low resistance value. $Mn_{0.27}Fe_{0.16}Ni_{0.27}Y_{0.2}Al_{0.1}O_{1.5}$ to which no $ZrO_2$ was added was calcined at 1,200° C. for 2 hours, and sintered at 1,400° C. for 1 hour, thereby manufacturing a temperature sensor, as shown in FIG. 1. The results of the test indicates that the resistance at 0° C. was about 100 kohm, but the resistance at 900° C. was 10 ohm or lower, which could be considered to be a measurement error.

Example 3-2

In order to increase the low resistance value at 900° C. shown in the above comparative example, a temperature sensor was manufactured according to the present application, and the resistance value thereof was measured. First, $Fe_{0.16}Ni_{0.27}Y_{0.2}Al_{0.1}O_{1.5}$ powder exhibiting low resistance was prepared by heat treatment at 1,200° C. for 2 hours. Furthermore, $ZrO_2$ having added thereto 20 mole % of $Y_2O_3$ was heat-treated at 1,550° C. to prepare powder having a large particle size and showing high resistance. Then, the powders were mixed with each other at a ratio of 4:6 to make powder having a formula of $Mn_{0.108}Fe_{0.064}Ni_{0.108}Y_{0.28}Al_{0.04}Zr_{0.402}O_{1.701}$.

The powder was sintered at 1,400° C. for 1 hour, and molded as shown in FIG. 1 to manufacture a temperature sensor sample. The temperature-resistance characteristics of the temperature sensor sample are shown by the curve 40 of FIG. 2. As a result, it could be seen that the overall resistance values increased compared to those of the comparative example 30. The resistance at 0° C. was about 2 Mohm, and the resistance at a high temperature of 900° C. was about 40 ohm. These resistance values are values that can be sufficiently measured with a universal meter. At a high temperature of 900° C., the resistance of the temperature sensor 40 of the present application manufactured using $ZrO_2$ having added thereto 20 mole % of $Y_2O_3$ was about 6 times higher than that of the temperature sensor 30 manufactured without adding $ZrO_2$, and it is the value that can be reliably measured even with a general meter.

Example 3-3

In a comparative example, a temperature sensor sample, having the same composition ($Mn_{0.108}Fe_{0.064}Ni_{0.108}Y_{0.28}Al_{0.04}Zr_{0.402}O_{1.701}$) as the temperature sensor of Example 3-2 but manufactured without heat treatment of $ZrO_2$ at 1,550° C., was manufactured by mixing each metal oxide reagent from the first, calcining the mixture at 1,200° C. for 2 hours, and sintering the calcined mixture at 1,400° C. for 1 hour. The results of measuring the temperature-resistance characteristics of the manufactured temperature sensor sample are plotted by the curve 50 of FIG. 2. In other words, the temperature sensor of the comparative example had the same composition as the temperature sensor of Example 3-2, but the manufacturing method thereof was the same as the temperature sensor manufacturing method of the of Example 3-1. The results indicate that the temperature sensor of the comparative example exhibited a high slope and insufficient linearity, compared to the temperature-resistance characteristics of Example 3-2 or 3-1. In addition, the overall resistance values were very high, and particularly the resistance at room temperature was similar to that of an insulating material, and thus could not be measured.

Example 4

Analysis of Metal Oxide Powder of the Present Application

Example 4-1

Figure 3:
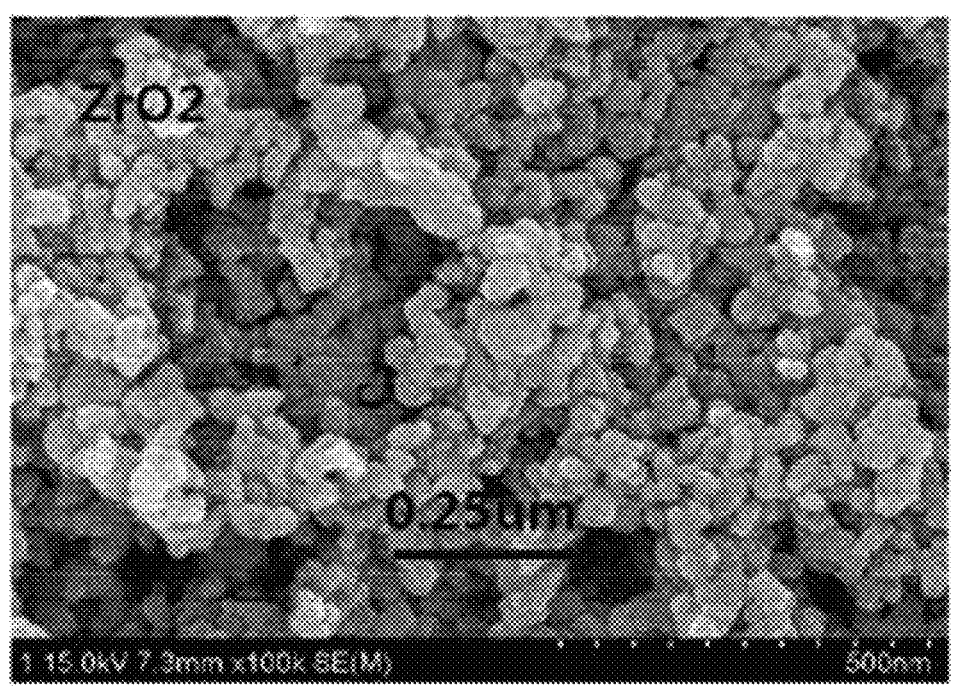
FIG. 3 is an electron microscope image of a pure $ZrO_2$ powder material according to an embodiment of the present application.

FIG. 3 is an electron microscope image of a pure $ZrO_2$ powder material according to an embodiment of the present application. As can be seen therein, pure $ZrO_2$ particles had a very small particle size of 50 nm and a uniform particle size distribution.

The composition was obtained by adding each of 20 mole % of $Y_2O_3$, 20 mole % of $CeO_2$, 10 mole % of CaO and 5 mole % of MgO to $ZrO_2$ of FIG. 3 and heat-treating the mixtures at 1,550° C. for 12 hours, and then the composition was subjected to grinding. The particle sizes of the ground powder are shown in FIGS. 4 to 7, respectively.

Figure 4:
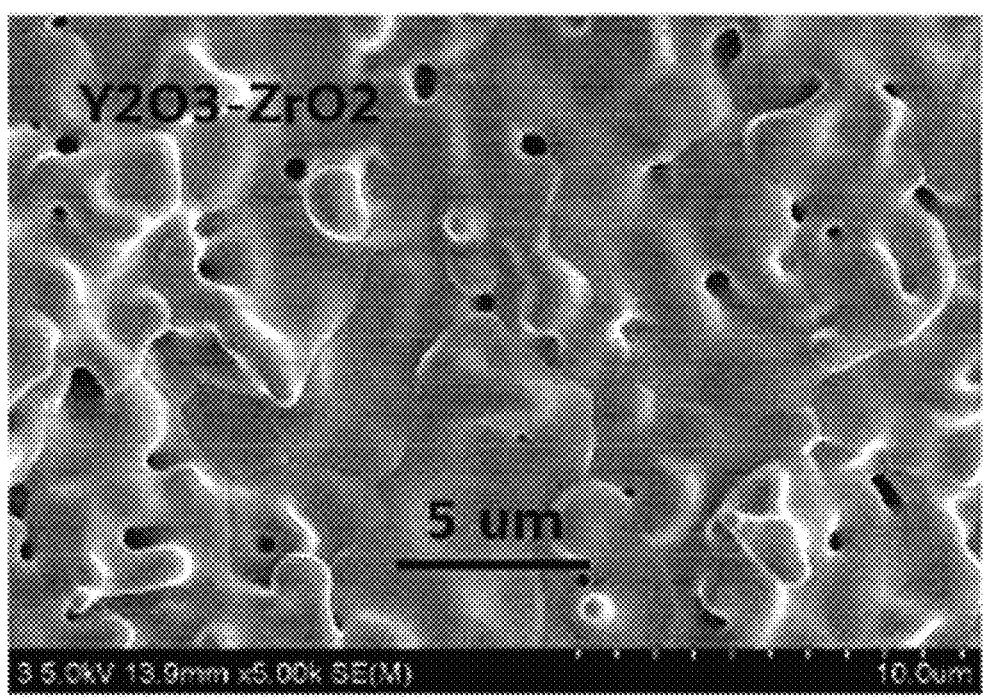
FIG. 4 is an electron microscope image of particles that are obtained by heat-treating $ZrO_2$ having added thereto 20 mole % of $Y_2O_3$ at 1,550° C. for 12 hours according to an embodiment of the present application.

FIG. 4 is a photograph of particles obtained by heat-treating a composition, having 20 mole % of $Y_2O_3$ added to $ZrO_2$, at 1,550° C. for 12 hours. As can be seen therein, most particles had a diameter of 5 μm or greater. This size was at least 100 times than that before heat-treatment.

Figure 5:
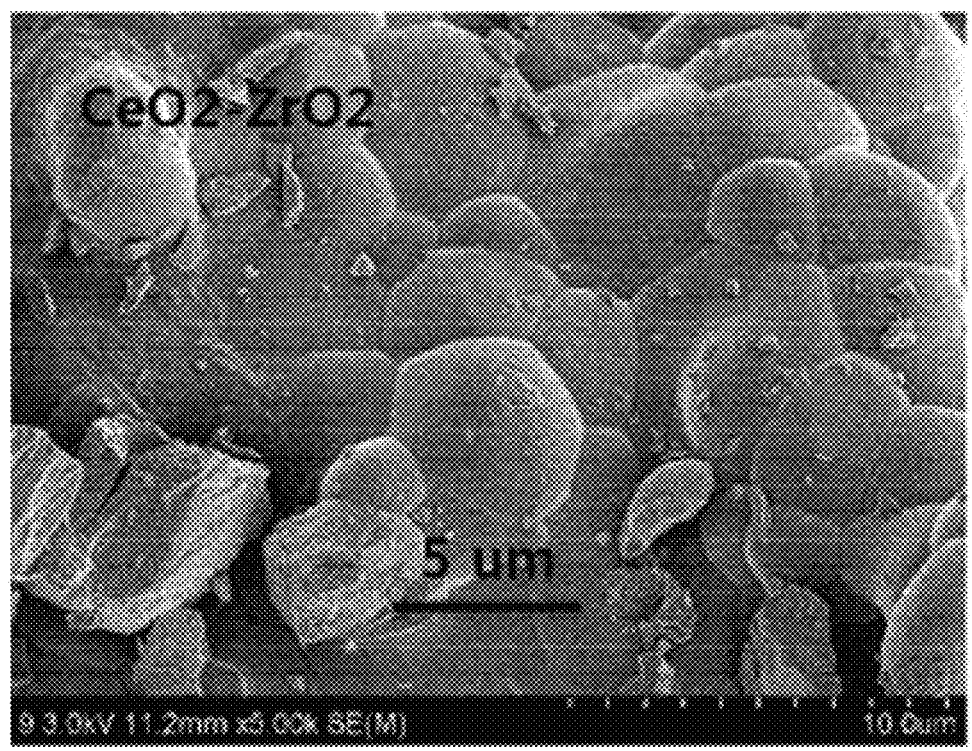
FIG. 5 is an electron microscope image of particles that are obtained by heat-treating $ZrO_2$ having added thereto 20 mole % of $CeO_2$ at 1,550° C. for 12 hours according to an embodiment of the present application.
Figure 6:
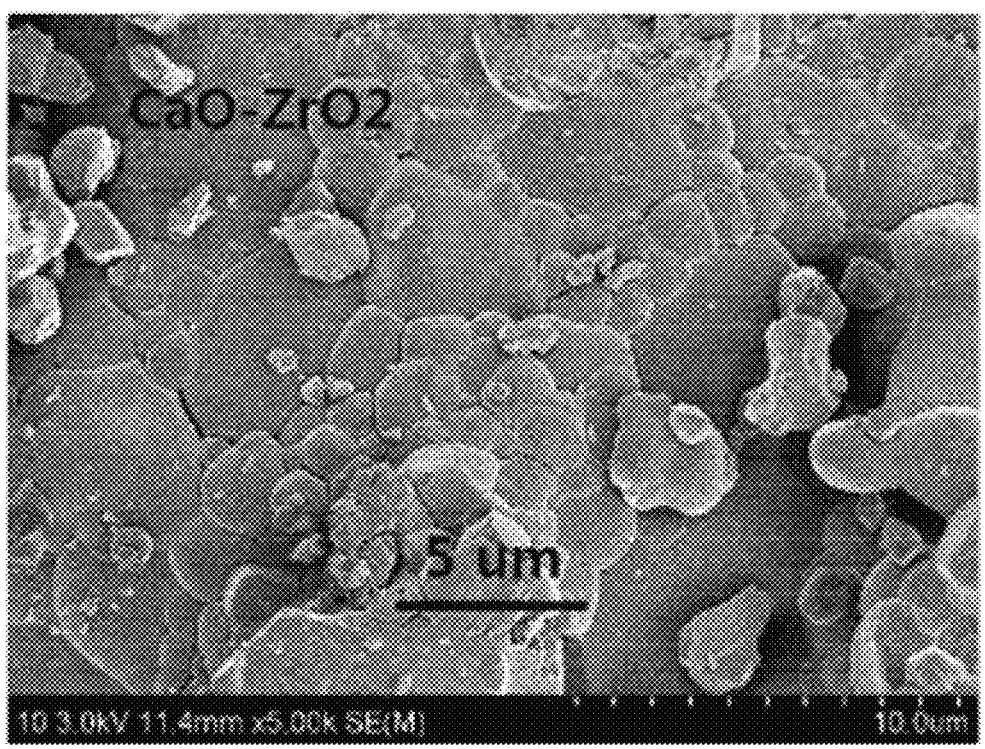
FIG. 6 is an electron microscope image of particles that are obtained by heat-treating $ZrO_2$ having added thereto 10 mole % of $CaO$ at 1,550° C. for 12 hours according to an embodiment of the present application.
Figure 7:
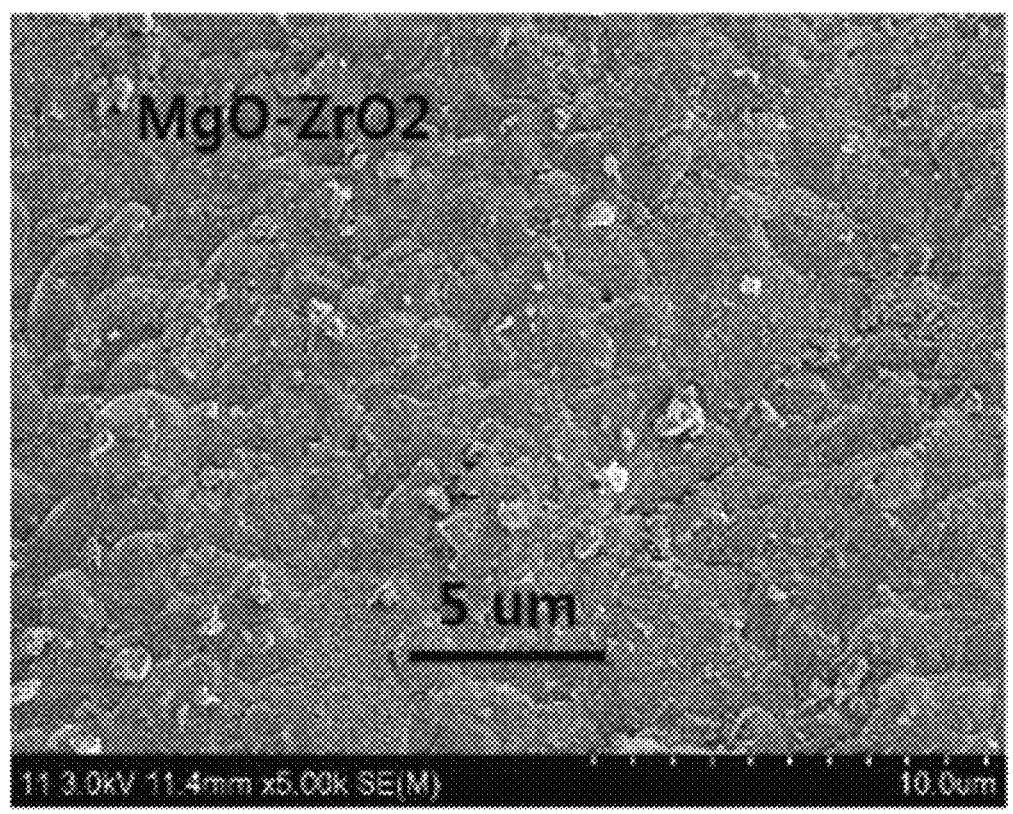
FIG. 7 is an electron microscope image of particles that are obtained by heat-treating $ZrO_2$ having added thereto 5 mole % of $MgO$ at 1,550° C. for 12 hours according to an embodiment of the present application.

However, in FIGS. 5 to 7, it could be seen that an increase in the particle size of $ZrO_2$ was not significant. The particle size was about 5 μm or less, and the temperature-resistance characteristics exhibited a small increase in resistance, compared to the temperature-resistance characteristics of Example 3-2 (the curve 40 of FIG. 2). It is believed that the reactivity of $ZrO_2$ changed depending on the kind and amount of material added, and thus the particle size also changed.

Example 4-2

In addition, it is expected that, when heat treatment is performed at a temperature higher than 1,550° C., the particle size will be larger than that of $ZrO_2$ having added thereto 20 mole % of $Y_2O_3$, and thus the temperature-resistance characteristics will further be improved.

Moreover, when the mixing ratio between large-particle powder, obtained by high-temperature heat treatment of $ZrO_2$, and small-particle powder having low resistance, is changed, the resistance value can be easily changed.

Furthermore, when either a single component, such as $Al_2O_3$, $Y_2O_3$, $CeO_2$, MgO, $SiO_2$, $Ta_2O_5$ or $ThO_2$, having a high melting point and high resistance, like $ZrO_2$, or a composite metal oxide composed of two or more phases to replace the single components, or a metal oxide having added thereto an additive for particle growth or phase stabilization, or a metal oxide obtained by oxidation of a metal element or a metal compound is allowed to grow into large particles by heat treatment at a temperature equal to or higher than ½ of the melting temperature thereof, and then is mixed with a low-resistance material, the temperature range to be measured by resistance can be easily controlled. As used herein, the term "large particles" may refer to large single particles such as single crystals, and may also refer to particle aggregates consisting of densely bonded polycrystals. However, the grain boundary between polycrystals is unstable, and thus it is preferred that the unit particles of polycrystals have a large particle size.

In addition, if small particles are present due to grinding of large particles having high resistance during grinding after heat-treatment, the effect of controlling resistance can be reduced. For this reason, when only particles having a desired size, selected by particle sieving after grinding, are used, the resistance of the temperature sensor can be more easily controlled.

While the present application has been described with reference to the embodiments, it will be understood by those skilled in the art to which the present application pertains that the present application may be implemented in other specific forms without departing from the essential characteristics of the present application. Therefore, the embodiments disclosed herein should be considered in an illustrative sense rather than a limiting sense. Furthermore, the scope of the present application is defined by the appended claims rather than the detailed description, and all differences falling within a range equivalent to the claims should be interpreted as being included in the scope of the present application.

The invention claimed is:

1. A metal-oxide sintered body having a formula of $Mn_{0.108}Fe_{0.064}Ni_{0.108}Y_{0.28}Al_{0.04}Zr_{0.402}O_{1.701}$.

2. A method for producing a metal-oxide sintered body, the method comprising the steps of:
   a) mixing $ZrO_2$ with one or more materials serving to stabilize $ZrO_2$, and selected from the group consisting of $Al_2O_3$, $Y_2O_3$, $CeO_2$, MgO, $SiO_2$, $Ta_2O_5$ and $ThO_2$, followed by heat treatment at a temperature equal to or higher than ½ of the melting temperature of $ZrO_2$, to prepare stabilized zirconia ($ZrO_2$) powder;
   b) heat-treating a composition having a formula of $Mn_{0.27}Fe_{0.16}Ni_{0.27}Y_{0.2}Al_{0.1}O_{1.5}$ at a temperature ranging from 1,000° C. to 1,500° C. for 1-5 hours to prepare powder; and
   c) mixing the powder prepared in step a) with the powder prepared in step b) to prepare a mixture, and heat-treating the mixture at a temperature ranging from 1,100° C. to 1,700° C. for 30 minutes to 2 hours, thereby producing a sintered metal-oxide having a formula of $Mn_{0.108}Fe_{0.064}Ni_{0.108}Y_{0.28}Al_{0.04}Zr_{0.402}O_{1.701}$.

3. The method of claim 2, wherein the heat treatment at step a) is performed at a temperature ranging from 1,000° C. to 2,000° C. for 10-15 hours.

4. The method of claim 3, wherein the heat treatment at step a) is performed at 1,550° C. for 12 hours.

5. A sintered metal-oxide produced according to the method of claim 4.

6. A sintered metal-oxide produced according to the method of claim 3.

7. The method of claim 2, wherein the powder prepared at step a) has a relatively large particle size, the powder prepared at step b) has a relatively small particle size, and the two powders at step c) are mixed with each other at a ratio ranging from 95:5 to 5:95.

8. A sintered metal-oxide produced according to the method of claim 7.

9. The method of claim 2, further comprising the step of selecting powder having a desired particle size by sieving after preparing the powder at step a).

10. A sintered metal-oxide produced according to the method of claim 9.

11. A sintered metal-oxide produced according to the method of claim 2.

12. A thermistor element comprising the sintered metal-oxide of claim 11.

13. A temperature sensor comprising the thermistor element of claim 12.

* * * * *